US012523632B2

United States Patent
Harada et al.

(10) Patent No.: US 12,523,632 B2
(45) Date of Patent: Jan. 13, 2026

(54) ELECTROPHORESIS APPARATUS AND METHOD

(71) Applicant: SHIMADZU CORPORATION, Kyoto (JP)

(72) Inventors: Akira Harada, Kyoto (JP); Akihiro Arai, Kyoto (JP); Hidesato Kumagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 844 days.

(21) Appl. No.: 17/857,294

(22) Filed: Jul. 5, 2022

(65) Prior Publication Data

US 2023/0010554 A1 Jan. 12, 2023

(30) Foreign Application Priority Data

Jul. 7, 2021 (JP) ................................ 2021-112661

(51) Int. Cl.
*G01N 27/447* (2006.01)

(52) U.S. Cl.
CPC . *G01N 27/44791* (2013.01); *G01N 27/44743* (2013.01); *G01N 27/44773* (2013.01); *G01N 27/4473* (2013.01)

(58) Field of Classification Search
CPC ......... G01N 27/4473; G01N 27/44743; G01N 27/44773; G01N 27/44791
See application file for complete search history.

(56) References Cited

U.S. PATENT DOCUMENTS

| 2007/0207516 | A1* | 9/2007 | Doupe | G01N 21/31 |
| | | | | 435/11 |
| 2012/0021451 | A1* | 1/2012 | Matsumoto | G01N 27/44791 |
| | | | | 435/287.1 |
| 2013/0213809 | A1* | 8/2013 | Besselink | G01N 27/44743 |
| | | | | 204/601 |
| 2015/0136604 | A1* | 5/2015 | Nielsen | B01F 33/30 |
| | | | | 204/453 |
| 2018/0217093 | A1* | 8/2018 | Arai | G01N 27/44717 |
| 2019/0162708 | A1* | 5/2019 | Yanagisawa | G01N 30/72 |
| 2020/0256830 | A1 | 8/2020 | Arai | |

FOREIGN PATENT DOCUMENTS

| JP | 58-60251 A | 4/1983 |
| JP | 9-89837 A | 4/1997 |
| JP | 11-162920 A | 6/1999 |
| JP | 2001-289697 A | 10/2001 |
| JP | 2005-257652 A | 9/2005 |

(Continued)

OTHER PUBLICATIONS

Chinese Office Action dated Nov. 29, 2024 in Application No. 202210796565.x.

(Continued)

*Primary Examiner* — Jennifer Wecker
(74) *Attorney, Agent, or Firm* — Sughrue Mion, PLLC

(57) ABSTRACT

An electrophoresis apparatus includes a dilution unit, an electrophoresis unit, and a control device. The dilution unit dilutes a sample with dilution water. The electrophoresis unit analyzes the sample diluted by the dilution unit by electrophoresing the sample. The control device controls the dilution unit and the electrophoresis unit.

13 Claims, 15 Drawing Sheets

(56) References Cited

FOREIGN PATENT DOCUMENTS

| | | |
|---|---|---|
| JP | 2012-26739 A | 2/2012 |
| JP | 2020-128904 A | 8/2020 |
| WO | 2014/203306 A1 | 12/2014 |

OTHER PUBLICATIONS

Office Action issued May 21, 2024 in Japanese Application No. 2021-112661.
Office Action issued May 25, 2024 in Chinese Application No. 202210796565.X.
Communication dated Sep. 4, 2024 issued by the State Intellectual Property Office of the P.R.China in application No. 202210796565.X.

\* cited by examiner (A)

(B)

(C)

(D)

ELECTROPHORESIS APPARATUS AND METHOD

BACKGROUND OF THE INVENTION

Field of the Invention

The present disclosure relates to an electrophoresis apparatus and method.

Description of the Background Art

For example, Japanese Patent Laying-Open No. 2020-128904 proposes an electrophoresis apparatus. The electrophoresis apparatus analyzes a sample by separating the sample by electrophoresis using a device such as a microchip or a capillary.

SUMMARY OF THE INVENTION

In the electrophoresis apparatus disclosed in Japanese Patent Laying-Open No. 2020-128904, however, a sample excessively high in concentration may cause deterioration in performance of the analysis of the sample.

It is therefore an object of the present disclosure to provide a technique for preventing deterioration in performance of analysis of a sample even when the concentration of the sample is excessively high.

An electrophoresis apparatus of the present disclosure includes a dilution unit, an electrophoresis unit, and a control device. The dilution unit dilutes a sample with dilution water. The electrophoresis unit analyzes the sample diluted by the dilution unit by electrophoresing the sample. The control device controls the dilution unit and the electrophoresis unit.

A method of the present disclosure is a method using an electrophoresis apparatus. The method includes diluting a sample with dilution water, and analyzing the sample diluted by a dilution unit by electrophoresing the sample.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
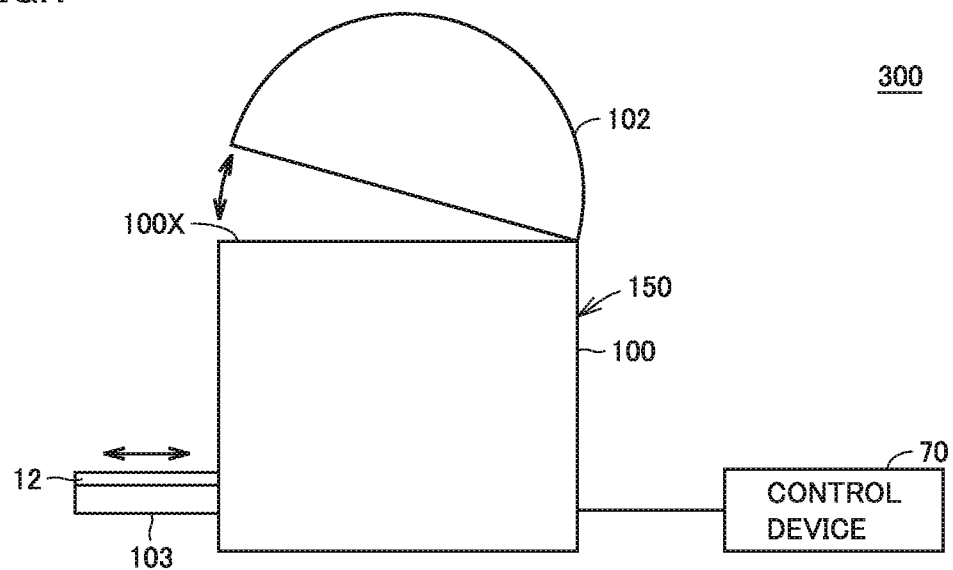
FIG. 1 is a diagram illustrating a configuration example of an electrophoresis system.

Embodiments of the present disclosure will be described in detail with reference to the drawings. Note that the same or corresponding parts in the drawings are denoted by the same reference numerals to avoid the description from being redundant.

[Electrophoresis System]

FIG. 1 is a diagram illustrating a configuration example of an electrophoresis apparatus 300. With reference to FIG. 1, electrophoresis apparatus 300 includes an analysis device 150 and a control device 70. Analysis device 150 includes a main body 100 and a cover 102. A user or the like opens or closes cover 102 to open or close an opening 100X of main body 100. Alternatively, analysis device 150 may drive cover 102. The user can set a sample, a separation buffer, and the like in main body 100 of analysis device 150 with cover 102 open.

Main body 100 is provided with a drawer 103. Drawer 103 has a plate 12 placed thereon. The sample to be analyzed is placed on plate 12. The user can pull out drawer 103 from main body 100 and push drawer 103 into main body 100. Plate 12 placed on drawer 103 can be pulled out to a position where the user can place the sample. Further, regardless of whether opening 100X is open or closed, the user can pull out drawer 103. This allows plate 12 to slide to the position where the user can place the sample and the like with cover 102 closed. This in turn allows an increase in user convenience. Control device 70 is connected to analysis device 150. Control device 70 is, for example, a personal computer (PC).

[Overall Configuration of Electrophoresis Apparatus]

Figure 2:
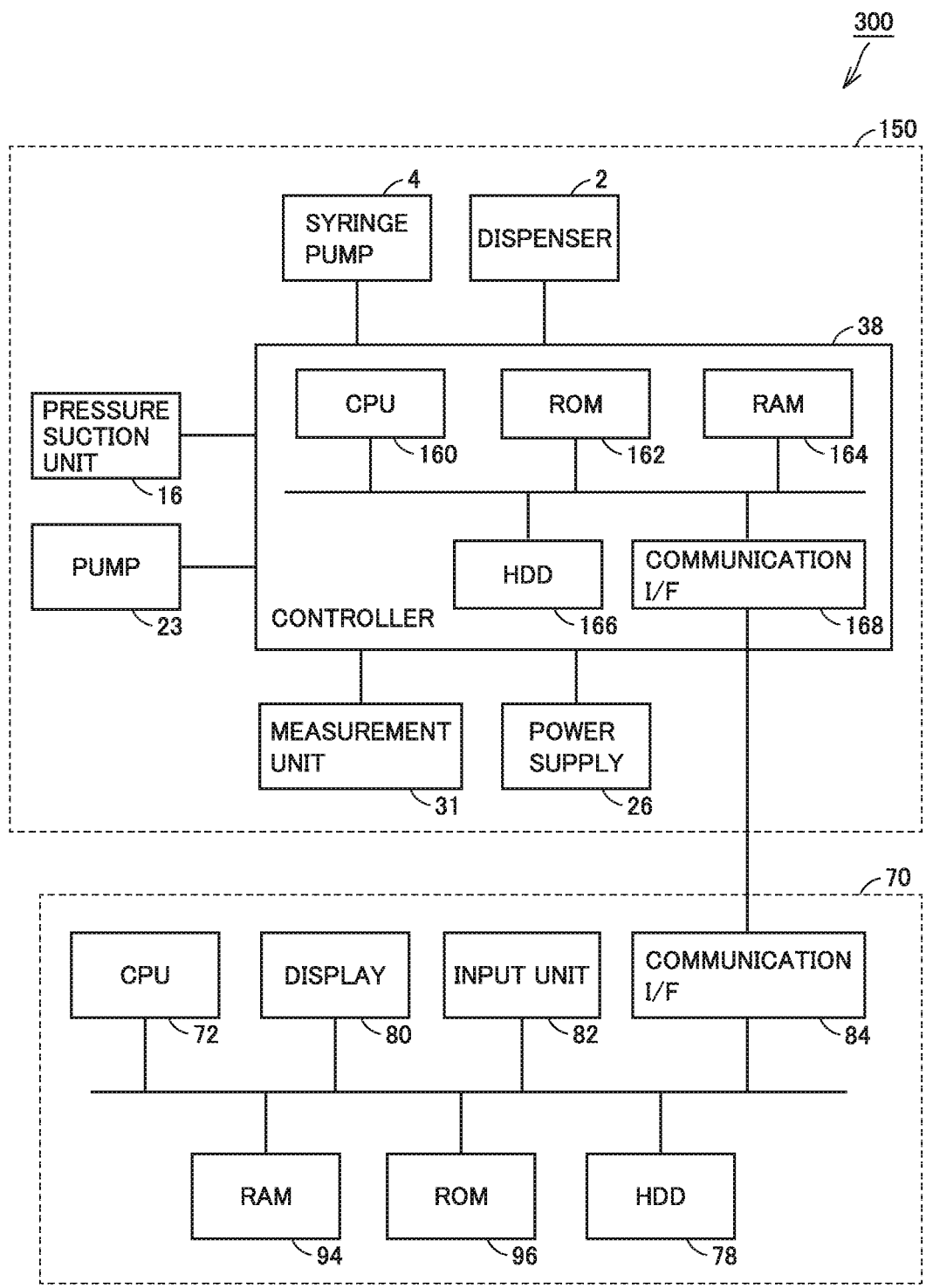
FIG. 2 is a block diagram of an overall configuration of an electrophoresis apparatus.
Figure 3:
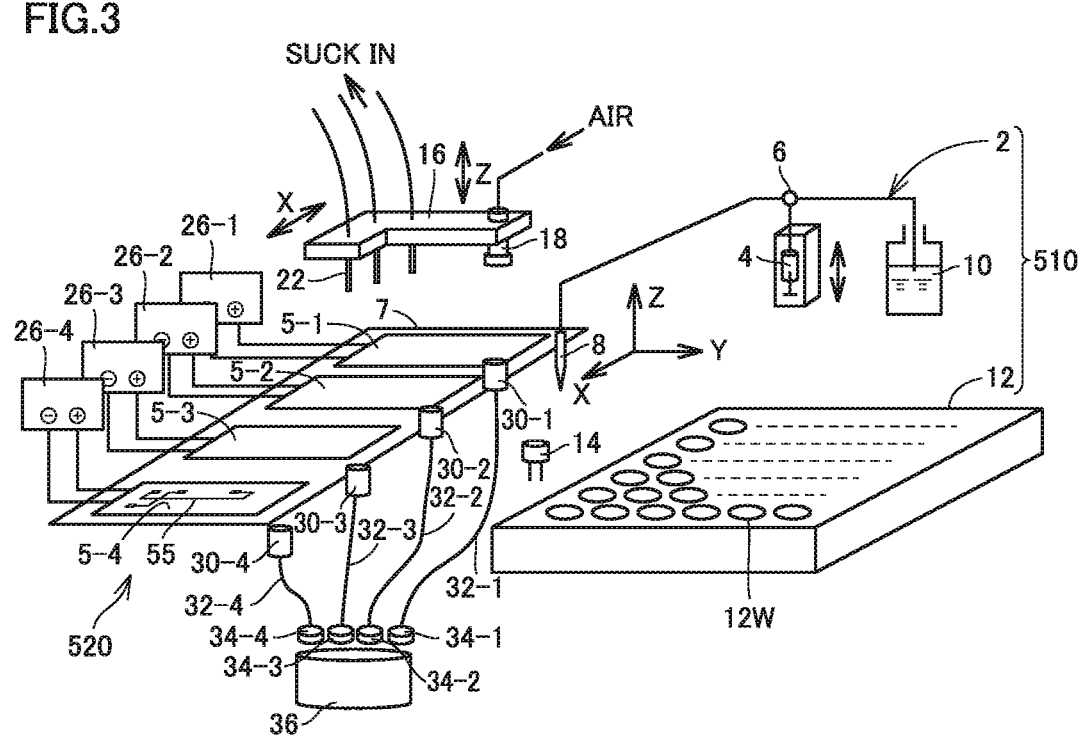
FIG. 3 is a diagram schematically illustrating a configuration of a part of the electrophoresis apparatus.

FIG. 2 is a diagram schematically illustrating an overall configuration of a microchip electrophoresis apparatus according to the embodiment of the present invention. FIG. 3 is a diagram schematically illustrating a configuration of a main part of electrophoresis apparatus 300 illustrated in FIG. 2. With reference to FIG. 2, analysis device 150 includes a dispenser 2, a syringe pump 4, a pressure suction unit 16, a pump 23, a power supply 26, a measurement unit 31, and a controller 38. Analysis device 150 is communicatively connected with control device 70. Note that power supply 26 is also referred to as a power supplies 26-1 to 26-4 as described later.

With reference to FIG. 3, analysis device 150 further includes a plurality of (for example, four) microchips 5-1 to 5-4, a holder 7, and plate 12.

Microchips 5-1 to 5-4 are each provided with one electrophoresis channel that is used for processing one sample. Examples of the sample include a protein, a sugar chain, and a nucleic acid (for example, a ribonucleic acid (RNA), a deoxyribonucleic acid (DNA), or the like). In the present embodiment, electrophoresis apparatus 300 can detect not only the concentration of the sample but also a parameter different from the concentration of the sample. The parameter different from the concentration of the sample is, for example, the size of a fragment of RNA or DNA.

During analysis operation, microchips 5-1 to 5-4 are held by holder 7. Hereinafter, microchips 5-1 to 5-4 may be collectively referred to as a "microchip 5". Further, a configuration where microchip 5 can be cleaned for repeated uses may be employed. Note that microchip 5 may be of a disposable type that is used once and discarded.

Dispenser 2 is configured to dispense the separation buffer and the sample into microchips 5-1 to 5-4. The separation buffer is also used as a "separation medium", and includes, for example, at least either a pH buffer or a water-soluble polymer (such as a cellulose-based polymer). Dispenser 2 serves as a "moving unit" that moves a dispensing probe 8 between a position where a liquid to be dispensed is sucked and a position over microchip 5 where the liquid is dispensed. Specifically, dispenser 2 includes dispensing probe 8, syringe pump 4, a storage container 10 that stores cleaning water, and a three-way solenoid valve 6.

Dispensing probe 8 has a dispensing nozzle. Syringe pump 4 mainly sucks and discharges the separation buffer, the sample, or the cleaning water. Dispensing probe 8 and at least one storage container 10 are connected to syringe pump 4 via three-way solenoid valve 6.

A plurality of (in the present embodiment, 96) wells 12W (containers) are provided in plate 12. The sample is stored in wells 12W and dispensed to microchips 5-1 to 5-4 by dispenser 2. The separation buffer is stored in a container (not illustrated) and dispensed to microchips 5-1 to 5-4 by dispenser 2.

Pressure suction unit 16 serves as a "filling unit" that fills the electrophoresis channel of microchip 5 with the separation buffer under pressure. Pump 23 serve as a suction unit that sucks the liquid from reservoirs of microchips 5-1 to 5-4. Note that, although a plurality of units are disclosed in the present embodiment, at least one of components constituting one of the plurality of units and at least one of components constituting another unit may be the same. Pressure suction unit 16 injects a certain amount of separation buffer into one reservoir of the electrophoresis channel, and pneumatically fills the electrophoresis channel with the injected separation buffer from the reservoir. Pressure suction unit 16 includes an air supply port 18 and a suction nozzle 22. Pump 23 discharges an unnecessary separation buffer overflowing into another reservoir. Pressure suction unit 16 and pump 23 are provided in common for four microchips 5-1 to 5-4.

Dispenser 2 sucks the separation buffer or the sample into dispensing probe 8 by causing three-way solenoid valve 6 to connect dispensing probe 8 and syringe pump 4. When dispensing probe 8 is moved to above microchips 5-1 to 5-4, dispenser 2 causes syringe pump 4 to discharge the separation buffer or the sample to any one of reservoirs of the electrophoresis channels of microchips 5-1 to 5-4.

The cleaning water stored in storage container 10 is, for example, water (for example, distilled water). The cleaning water is typically used for cleaning microchip 5 and dispensing probe 8. Further, as described later, the cleaning water is also used as dilution water for diluting the sample.

Next, how to clean dispensing probe 8 will be described. A cleaner 14 is filled with a cleaning liquid. When cleaning dispensing probe 8, analysis device 150 switches three-way solenoid valve 6 to a state where syringe pump 4 and storage container 10 are connected, and sucks the cleaning liquid into syringe pump 4. Then, analysis device 150 immerses dispensing probe 8 in the cleaning liquid in cleaner 14, switches three-way solenoid valve 6 to a state where syringe pump 4 and dispensing probe 8 are connected, and discharges the cleaning liquid to cleaner 14 through dispensing probe 8. As a result, dispensing probe 8 is cleaned. Note that a place into which the cleaning liquid is discharged through dispensing probe 8 is not limited to cleaner 14, and may be another place. In the present embodiment, a cleaning unit 530 (see FIG. 11) includes cleaner 14, syringe pump 4, three-way solenoid valve 6, and storage container 10.

Next, how to clean the electrophoresis channels of microchips 5-1 to 5-4 will be described. In analysis device 150, when the electrophoresis channels of microchips 5-1 to 5-4 are cleaned with the cleaning water, dispenser 2 switches three-way solenoid valve 6 to a state where syringe pump 4 and storage container 10 are connected, and sucks the cleaning water into syringe pump 4. Analysis device 150 switches three-way solenoid valve 6 to a state where syringe pump 4 and dispensing probe 8 are connected. Then, analysis device 150 moves dispensing probe 8 to a reservoir of each of microchips 5-1 to 5-4 and dispenses a predetermined amount of cleaning water to the reservoir.

The cleaning water dispensed to the reservoir is forced into the electrophoresis channel by air sent from air supply port 18 of pressure suction unit 16, and the cleaning water overflowing from another reservoir is sucked through suction nozzle 22 and discharged to the outside by the pump. Further, electrophoresis apparatus 300 may clean the electrophoresis channel using a cleaning liquid different from the cleaning water.

Further, when analysis device 150 fills the electrophoresis channel with the separation buffer, pressure suction unit 16 moves to above microchips 5-1 to 5-4, presses air supply port 18 against the reservoir (reservoir to which the separation buffer is dispensed) located at one end of the electrophoresis channel of a corresponding one of microchips 5-1 to 5-4 while keeping air supply port 18 airtight, and inserts suction nozzle 22 into another reservoir. In this state, air is sent from air supply port 18 to force the separation buffer into the electrophoresis channel, and the separation buffer overflowing from another reservoir is sucked through suction nozzle 22 and discharged to the outside by pump 23.

A plurality of (for example, four) power supplies 26-1 to 26-4 are each provided to apply a voltage for electrophoresis to the electrophoresis channel of a corresponding one of microchips 5-1 to 5-4. When a voltage is applied to microchip 5 filled with the sample and the separation buffer, each substance contained in the sample is temporally separated. This allows electrophoresis apparatus 300 to analyze an analysis target substance.

Measurement unit 31 is configured to detect a sample component electrophoresed and separated in a separation channel 55 of each of microchips 5-1 to 5-4. Specifically, measurement unit 31 includes a plurality of (for example, four) liquid emitting diodes (LEDs) 30-1 to 30-4, a plurality of (for example, four) optical fibers 32-1 to 32-4, a plurality of (for example, four) filters 34-1 to 34-4, and a photomultiplier 36.

LEDs 30-1 to 30-4 each irradiate a part of the electrophoresis channel of a corresponding one of microchips 5-1 to 5-4 with excitation light. Optical fibers 32-1 to 32-4 each receive fluorescence generated when a sample component moving in the electrophoresis channel are excited by the excitation light emitted from a corresponding one of LEDs 30-1 to 30-4. Filters 34-1 to 34-4 each remove an excitation light component from the fluorescence received by a corresponding one of optical fibers 32-1 to 32-4 and transmits only a fluorescent component. Photomultiplier 36 receives the fluorescent component transmitted through filters 34-1 to 34-4. Photomultiplier 36 outputs an analysis signal corresponding to the amount of light received to control device 70. Control device 70 derives an analysis result based on the strength of the analysis signal and displays the analysis result on a display 80.

In the present embodiment, an electrophoresis unit 520 includes microchips 5-1 to 5-4, power supplies 26-1 to 26-4, LEDs 30-1 to 30-4, optical fibers 32-1 to 32-4, filters 34-1 to 34-4, and photomultiplier 36. Electrophoresis unit 520 configured as described above can analyze the sample the analysis by electrophoresing the sample.

In the present embodiment, microchips 5-1 to 5-4 are each provided with independent measurement unit 31, so that it is possible to detect fluorescence from the plurality of microchips that have sequentially performed processing in parallel until sample injection.

Causing LEDs 30-1 to 30-4 to emit at their respective timings different from each other allows one photomultiplier 36 to identify and detect fluorescence from the plurality of microchips 5-1 to 5-4. Note that the light source of the excitation light is not limited to such an LED, and another light source (for example, a laser diode (LD)) may be used.

When the separation buffer filling and sample injection into one electrophoresis channel are completed, controller 38 controls the operation of dispenser 2 so as to shift to separation buffer filling and sample injection into the next electrophoresis channel. Controller 38 controls the operation of power supplies 26-1 to 26-4 so as to apply an electrophoresis voltage to the electrophoresis channel into which the sample has been injected to cause electrophoresis. Controller 38 controls the detection operation by measurement unit 31. Controller 38 further cleans, in order to repeatedly use microchip 5, the electrophoresis channel in which the previous sample has been analyzed before filling the electrophoresis channel with the separation buffer. Further, dispenser 2 and plate 12 constitute a dilution unit 510 to be described later.

Controller 38 includes, as main components, a central processing unit (CPU) 60, a storage that stores a program and data, and a communication interface (I/F) 68. The components are connected to each other over a data bus.

The storage includes a read only memory (ROM) 162, a random access memory (RAM) 164, and a hard disk drive (HDD) 166. ROM 162 can store the program to be executed by CPU 160. RAM 164 can temporarily store data generated during the execution of the program by CPU 160 and data input via communication IN 168, and can serve as a temporary data memory used as a work area. HDD 166 is a nonvolatile storage device, and can store information generated by electrophoresis apparatus 300 such as the detection result from measurement unit 31. Alternatively, instead of HDD 166, a semiconductor storage device such as a flash memory may be used.

Communication I/F 168 is an interface for communicating with an external device including control device 70. Communication I/F 168 is implemented by an adapter, a connector, or the like. Note that the communication system may be, for example, a radio communications system such as Bluetooth (registered trademark) or a wireless local area network (LAN), or a wired communications system using a universal serial bus (USB) or the like.

Control device 70 is communicatively connected with analysis device 150 to exchange data with analysis device 150. Control device 70 is configured to control the operation of analysis device 150 and capture and process data acquired by measurement unit 31.

Specifically, control device 70 is mainly made up of a CPU 72 that is a processing unit. As control device 70, for example, a personal computer or the like may be used. Control device 70 includes CPU 72, a storage (a ROM 96, a RAM 94, and an HDD 78), a communication I/F 84, an input unit 82, and display 80.

ROM 96 can store a program to be executed by CPU 72. RAM 94 can temporarily store data generated during the execution of the program by CPU 72 and data input via communication IN 84 or input unit 82. Further, RAM 94 serves as a temporary data memory used as a work area. HDD 78 is a nonvolatile storage device, and can store information generated by control device 70. Alternatively, instead of HDD 78, a semiconductor storage device such as a flash memory may be used.

Communication I/F 84 is an interface for control device 70 to communicate with an external device including analysis device 150. Display 80 displays various screens such as a screen showing the analysis result or a mode setting screen (see FIG. 8 to be described later). Input unit 82 receives an input operation containing an instruction directed from a measurer to electrophoresis apparatus 300. Input unit 82 includes, for example, a keyboard, a mouse, and the like. Further, a touchscreen serving as both input unit 82 and display 80 may be used.

[Configuration Example of Microchip 5]

Figure 4:
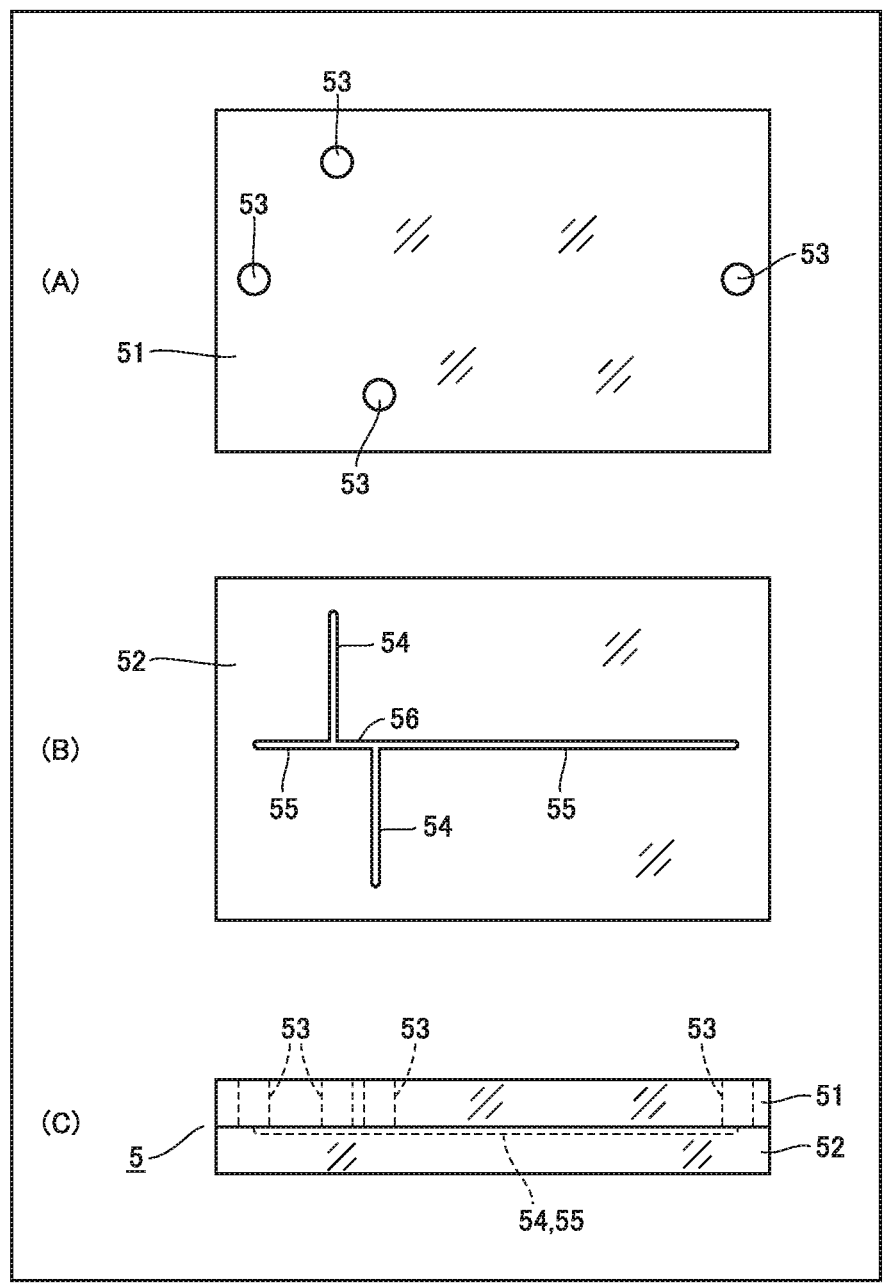
FIG. 4 is a diagram illustrating an example of a microchip.
Figure 5:
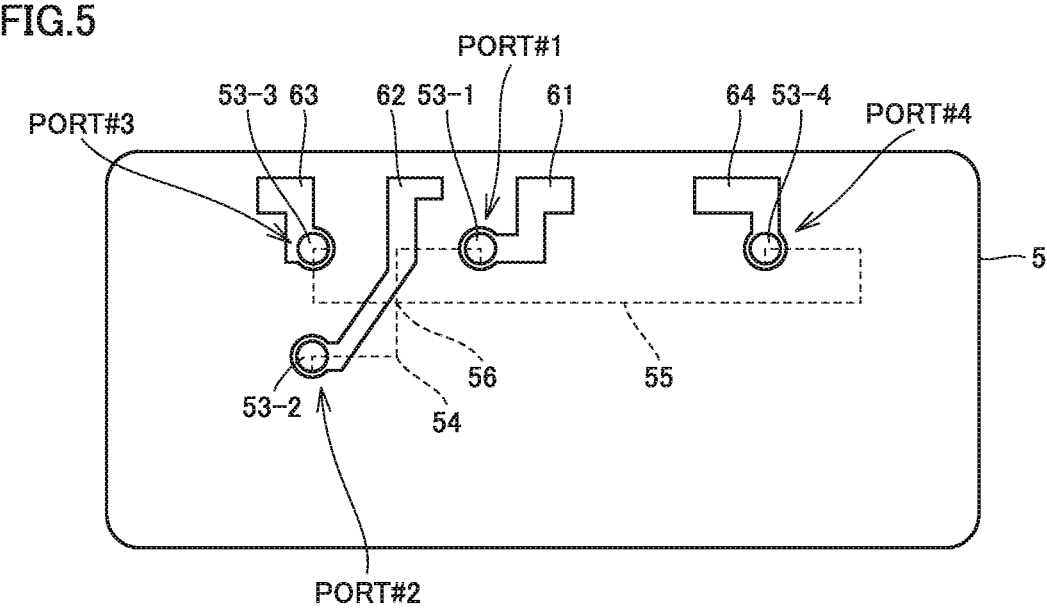
FIG. 5 is a diagram illustrating an example of the microchip.

FIGS. 4 and 5 are diagrams illustrating an example of microchip 5. As disclosed herein, the "microchip" means an electrophoresis device having an electrophoresis channel provided in a substrate, and is not necessarily limited to a small-sized device.

FIG. 4 at (A) is a plan view of a transparent substrate 51 included in microchip 5, FIG. 4 at (B) is a plan view of a transparent substrate 52 included in microchip 5, and FIG. 4 at (C) is a front view of microchip 5.

With reference to FIG. 4 at (C), microchip 5 includes a pair of transparent substrates 51, 52. Each of transparent substrates 51, 52 is, for example, a quartz glass or other glass substrate, or resin substrate. Transparent substrate 51 and transparent substrate 52 are placed on top of each other and bonded together.

As illustrated in FIG. 4 at (B), electrophoresis capillary grooves intersecting each other are provided on transparent substrate 52. Separation channel 55 serving as the electrophoresis capillary groove is a channel used for electrophoresis separation of the sample. A sample introduction channel 54 serving as the electrophoresis capillary groove is a channel used for introducing the sample into separation channel 55. Sample introduction channel 54 and separation channel 55 constitute the "electrophoresis channel". Sample introduction channel 54 and separation channel 55 intersect at an intersection position 56.

As illustrated in FIG. 4 at (A), four through holes are provided through transparent substrate 51 at positions corresponding to the ends of sample introduction channels 54, 55. The four through holes each serve as a corresponding one of reservoirs 53-1 to 54-4. Hereinafter, reservoirs 53-1 to 53-4 may be collectively referred to as a reservoir 53.

Microchip 5 basically has the configuration illustrated in FIG. 4, but, for easy handling, it is possible to provide an electrode terminal for applying the electrophoresis voltage on microchip 5, as illustrated in FIG. 5. FIG. 5 is a plan view of microchip 5.

With reference to FIG. 5, four reservoirs 53-1 to 53-4 each serve as a port for applying a voltage to sample introduction channel 54 and separation channel 55. A port #1 (reservoir 53-1) and a port #2 (reservoir 53-2) are positioned at both ends of sample introduction channel 54. A port #3 (reservoir 53-3) and a port #4 (reservoir 53-4) are positioned at both ends of separation channel 55. In order to apply a voltage to each of ports #1 to #4, four electrode patterns 61 to 64 are provided on microchip 5 (transparent substrate 51). Electrode patterns 61 to 64 are each provided to extend from a corresponding port toward a side end of microchip 5 and are connected to a corresponding one of power supplies 26-1 to 26-4 (see FIG. 3).

Further, after microchip 5 is filled with the separation buffer, dispensing probe 8 supplies the sample to reservoir 53-1. Note that the reservoir 53-1 corresponds to a "predetermined position" in the present disclosure. The predetermined position is an analysis start position to which the sample is supplied for the electrophoresis unit to start to analyze the sample.

Figure 6:
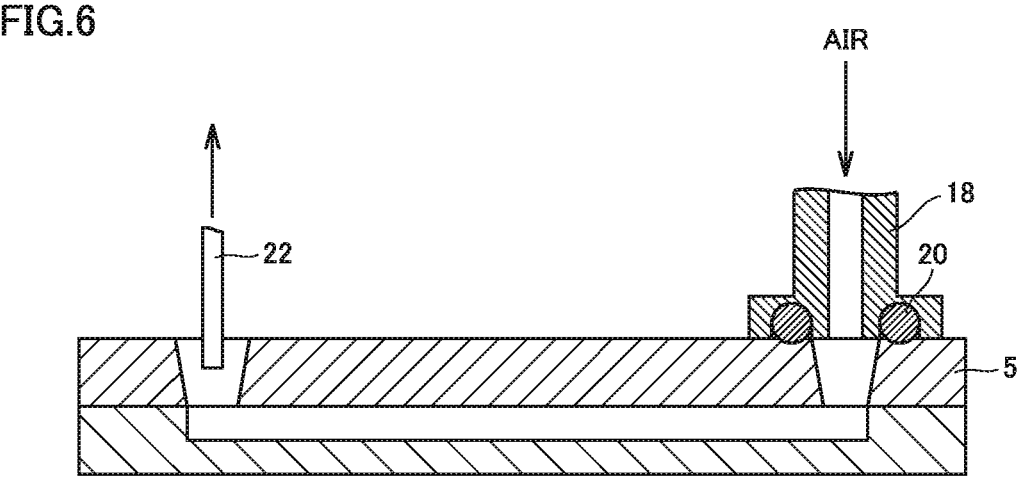
FIG. 6 is a diagram schematically illustrating a connection state between an air supply port and a suction nozzle of a pressure suction unit, and the microchip.

FIG. 6 is a diagram schematically illustrating a connection state between air supply port 18 and suction nozzle 22 of pressure suction unit 16, and microchip 5.

With reference to FIG. 6, an O-ring 20 is provided at a tip of air supply port 18. Pressing air supply port 18 against one reservoir 53 of microchip 5 allows air supply port 18 to be attached to electrophoresis channels 54, 55 of microchip 5 with air supply port 18 kept airtight. This allows air to be sent under pressure from air supply port 18 into electrophoresis channels 54, 55. Suction nozzle 22 is inserted into another reservoir 53, and sucks and discharges an unnecessary separation buffer, cleaning water, or the like overflowing from electrophoresis channels 54, 55.

[Dilution Unit]

For the electrophoresis apparatus in the related art, when the concentration of the sample is excessively high, the analysis performance may deteriorate due to the following reasons (first to fourth reasons). Here, the concentration of the sample is, for example, a value obtained by dividing the amount of the analysis target component contained in the sample by the total amount of the sample.

The first reason is that when the concentration of the sample is excessively high, each substance contained in the sample cannot be separated in microchip 5 even when a voltage is applied to microchip 5. This makes the electrophoresis apparatus unable to analyze the analysis target substance, so that the performance of the analysis of the analysis target substance deteriorates.

The second reason is that when the concentration of the sample is excessively high, the surface of microchip 5 may deteriorate. This makes microchip 5 unable to appropriately electrophoresing the sample. This also makes the electrophoresis apparatus unable to analyze the analysis target substance, so that the performance of the analysis of the analysis target substance deteriorates.

The third reason is that when the surface of microchip 5 deteriorates, a current having a magnitude different from an expected magnitude may flow through microchip 5 even when a voltage is applied by power supplies 26-1 to 26-4. This also makes the electrophoresis apparatus unable to analyze the analysis target substance, so that the performance of the analysis of the analysis target substance deteriorates.

The fourth reason is that electrophoresis apparatus 300 of the present embodiment has a predetermined normal range of the concentration of the sample. When the concentration of the sample is excessively high, the concentration of the sample may fall outside the normal range. This also makes the electrophoresis apparatus unable to analyze the analysis target substance, so that the performance of the analysis of the analysis target substance deteriorates.

As described above, when the concentration of the sample is excessively high, the analysis performance of the electrophoresis apparatus may deteriorate. Therefore, electrophoresis apparatus 300 of the present embodiment includes dilution unit 510. Dilution unit 510 dilutes the sample with dilution water. Then, the electrophoresis unit analyzes the sample thus diluted by electrophoresing the sample. This can make the concentration of the sample lower even when the concentration of the sample is excessively high. This in turn makes it possible to prevent deterioration in the performance of the analysis of the sample.

[Configuration of Plate]

Figure 7:
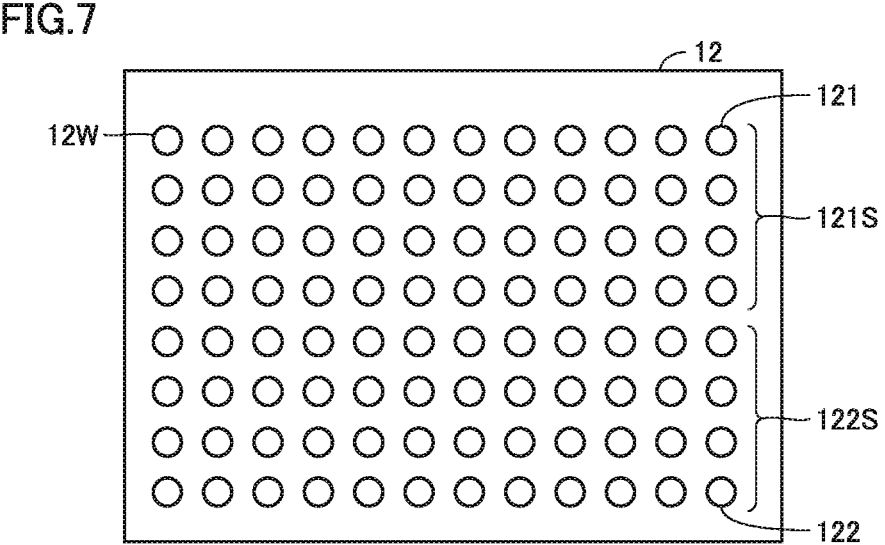
FIG. 7 is a diagram illustrating a configuration example of a plate.

FIG. 7 is a diagram illustrating a configuration example of plate 12. As described above, plate 12 includes 96 wells 12W. Hereinafter, a sample before being diluted by dilution unit 510 is also referred to as a "pre-dilution sample". Further, a sample diluted by dilution unit 510 is also referred to as a "diluted sample". The pre-dilution sample is stored in some wells 12W of 96 wells 12W (for example, one well 12W). Further, the sample is diluted using the other wells 12W of 96 wells 12W.

In the present embodiment, the pre-dilution sample is stored in any well 12W of 48 wells 12W among 96 wells 12W. Then, the sample is diluted using any well 12W of remaining 48 wells 12W. In the present embodiment, 48 wells 12W in which the pre-dilution sample is stored are each referred to as a "first container 121". Further, 48 wells 12W used for diluting the sample are each referred to as a "second container 122". Further, 48 first containers 121 are also collectively referred to as a "first container group 121S". 48 second containers 122 are collectively referred to as a "second container group 122S".

In the present embodiment, the above-described cleaning water is used as the dilution water used for diluting the sample. That is, the dilution water and the cleaning water for cleaning components to be cleaned (dispensing probe 8, microchip 5, and the like) of the electrophoresis apparatus are the same.

[Dilution Processing]

Figure 8:
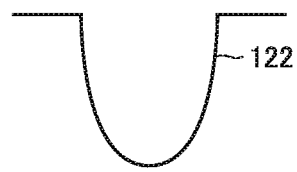
FIG. 8 is a diagram illustrating a specific flow of diluting a sample.
Figure 8:
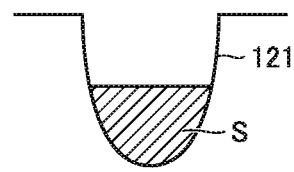
Figure 8:
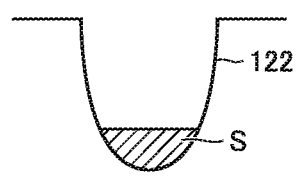
Figure 8:
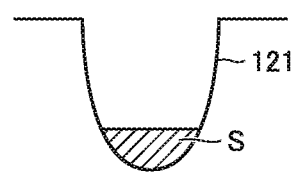
Figure 8:
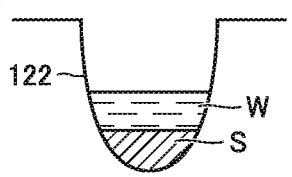
Figure 8:
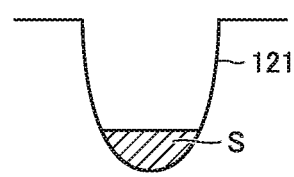
Figure 8:
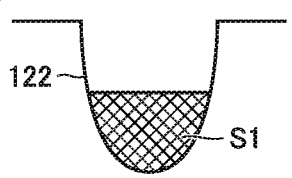
Figure 8:
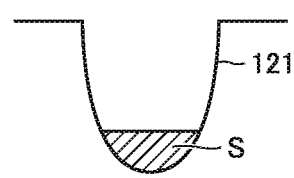

FIG. 8 is a diagram illustrating a specific flow of diluting the sample by dilution unit 510. As described above, dilution unit 510 includes dispenser 2 and plate 12. That is, dilution unit 510 includes storage container 10 that stores the dilution water, first container 121 that stores the sample (pre-dilution sample), dispensing probe 8, and second container 122.

Further, as described in FIG. 1, after pulling out drawer 103, the user stores the sample (pre-dilution sample) into first container 121 (well 12W) of plate 12. FIG. 8 at (A) is a diagram illustrating a state where a pre-dilution sample S is stored in first container 121. When control device 70 dilutes pre-dilution sample S, dispensing probe 8 sucks part of pre-dilution sample S in first container 121 and discharges the part of pre-dilution sample S into second container 122. This causes pre-dilution sample S to be stored in second container 122.

Further, in the present embodiment, the minimum amount of pre-dilution sample S stored in first container 121 is predetermined. The minimum amount is, for example, 9 μL. In the present embodiment, the amount of the part of pre-dilution samples S is denoted as "a (μL)", which is a fixed value less than the minimum amount. That is, dispensing probe 8 moves pre-dilution sample S of "a (μL)" from first container 121 to second container 122.

FIG. 8 at (B) is a diagram illustrating a state where pre-dilution sample S is stored in second container 122. Next, dispensing probe 8 sucks the dilution water from storage container 10 and discharges the dilution water into second container 122. This causes second container 122 to store both pre-dilution sample S and dilution water W. Note that the example illustrated in FIG. 8 at (A) and (B) shows a configuration where dilution water W is stored into second container 122 after pre-dilution sample S is stored into second container 122. Pre-dilution sample S, however, may be stored into second container 122 after dilution water W is stored into second container 122.

FIG. 8 at (C) illustrates a state where pre-dilution sample S and dilution water W are stored together. In the state illustrated in FIG. 8 at (C), pre-dilution sample S may not be completely diluted. Therefore, in the present embodiment, dispensing probe 8 mixes pre-dilution sample S and dilution water W by repeatedly sucking and discharging pre-dilution sample S and dilution water W stored in second container 122. A force to suck and a force to discharge are applied to pre-dilution sample S and dilution water W. As a result, pre-dilution sample S and dilution water W are mixed.

FIG. 8 at (D) is a diagram illustrating a diluted sample S1 (mixed sample). Dispensing probe 8 sucks diluted sample S1 and supplies diluted sample S1 to the analysis start position (reservoir 53-1 described above) of electrophoresis unit 520. Then, electrophoresis unit 520 analyzes diluted sample S1 by electrophoresing diluted sample S1.

As described above, dilution unit 510 includes storage container 10 that stores dilution water W, first container 121 that stores pre-dilution sample S, dispensing probe 8, and second container 122. Further, dispensing probe 8 sucks pre-dilution sample S from first container 121 and discharges pre-dilution sample S into second container 122. Dispensing probe 8 further sucks dilution water W from the storage container 10 and discharges dilution water W into second container 122. This allows pre-dilution sample S to be suitably diluted by dispensing probe 8 and the like. Note that, as a modification, dilution unit 510 may be provided as separate components.

Further, as illustrated in FIG. 8 at (D), dispensing probe 8 mixes pre-dilution sample S and dilution water W by repeatedly sucking and discharging pre-dilution sample S and dilution water W stored in second container 122. This allows electrophoresis apparatus 300 to suitably dilute pre-dilution sample S even when pre-dilution sample S is not completely diluted. Note that, as a modification, a mixing unit that mixes pre-dilution sample S and dilution water W may be provided as separate components.

Further, as illustrated in FIG. 8 at (A) and (B), dispensing probe 8 sucks part of the sample stored in first container 121 and discharges the part of the sample into second container 122. That is, it is possible to prevent all of the sample stored in first container 121 from being consumed. This allows electrophoresis apparatus 300 to leave the pre-dilution sample. Therefore, the user can not only conduct the analysis of the diluted sample, but also use the pre-dilution sample for other analyses or the like, for example.

Further, as illustrated in FIG. 7, first container 121 and second container 122 are provided in one plate 12. It is therefore possible to reduce the number of components as compared with a configuration where first container 121 and second container 122 are provided in separate components. Note that, as a modification, first container 121 and second container 122 may be provided in separate components.

Further, the cleaning unit cleans dispensing probe 8 with the dilution water (cleaning water) stored in storage container 10. That is, the dilution water and the cleaning water can be stored in the same storage container 10. Note that, as a modification, a storage container storing the dilution water and a storage container storing the cleaning water may be provided as separate components.

[Display Screen]

Figure 9:
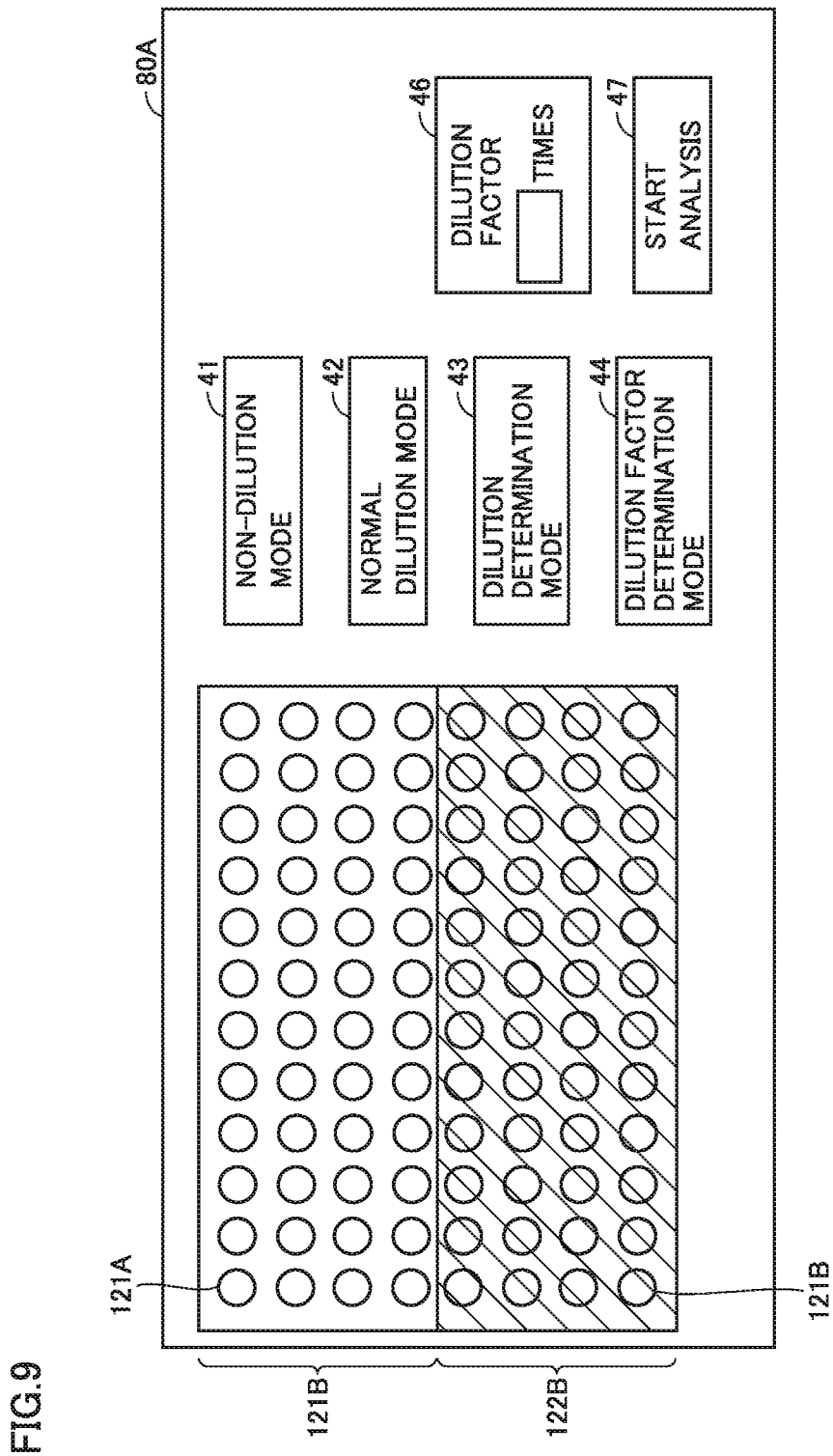
FIG. 9 is an example of a display screen displayed on a display.

FIG. 9 is an example of a display screen displayed in a display area 80A of display 80. In the example illustrated in FIG. 9, a first container image 121A, a second container image 122A, a non-dilution mode button 41, a normal dilution mode button 42, a dilution determination mode button 43, a dilution factor determination mode button 44, a dilution factor field 46, and an analysis start button 47 are displayed.

First, first container image 121A and second container image 122A will be described. First container image 121A is an image corresponding to first container 121. In other words, first container image 121A is an image imitating first container 121. Second container image 122A is an image corresponding to second container 122. In other words, second container image 122A is an image imitating second container 122.

As described above, after pulling out drawer 103, the user stores the sample into first container 121 (wells 12W) of plate 12. Further, as described above, second container 122 is used for diluting pre-dilution sample S.

Here, although the user should store the sample into first container 121 of plate 12, there is a possibility that the user erroneously stores the sample into second container 122. Therefore, in the present embodiment, display 80 displays first container image 121A and second container image 122A in different manners.

In the example illustrated in FIG. 9, 48 first container images 121A are collectively displayed as a first container group image 121B, and 48 second container images 122A are collectively displayed as a second container group image 122B. In the example illustrated in FIG. 9, first container group image 121B is higher in brightness than second container group image 122B. Note that, in the example illustrated in FIG. 9, second container group image 122B is entirely hatched.

As described above, display 80 displays first container image 121A and second container image 122A in different manners. This allows the user to distinguish between first container image 121A and second container image 122A and identify the position of the first container 121 in plate 12. It is therefore possible to reduce the possibility that the user erroneously stores the pre-dilution sample into second container 122.

Note that electrophoresis apparatus 300 may change the position of first container 121 and the position of second container 122 in response to user operation or the like. In this case, a display position of first container group image 121B and a display position of second container group image 122B are also changed in response to the change in the position of first container 121 and the position of second storage 122.

Further, electrophoresis apparatus 300 can set various modes in response to user operation or the like. Note that, when any mode is set, electrophoresis apparatus 300 stores a mode flag that can specify the mode into a predetermined storage area (for example, RAM 164). Storing the mode flag sets the mode indicated by the mode flag. When analysis start button 47 is operated with the mode set, electrophoresis apparatus 300 analyzes the sample in the set mode.

Non-dilution mode button 41 is a button for setting a non-dilution mode. The non-dilution mode is a mode in which the sample is analyzed without being diluted. When non-dilution mode button 41 is operated by the user, electrophoresis apparatus 300 analyzes the sample without diluting the sample.

Normal dilution mode button 42 is a button for setting a normal dilution mode. The normal dilution mode is a mode in which the sample is diluted and analyzed. When normal dilution mode button 42 is operated by the user and then analysis start button 47 is operated, electrophoresis apparatus 300 dilutes and analyzes the sample.

Further, when the normal dilution mode is set, the user is allowed to input the dilution factor to dilution factor field 46. The dilution factor is, for example, a dilution factor desired by the user. In the present embodiment, the value that can be input to dilution factor field 46 is a real number greater than 1. For example, when "4" is input to dilution factor field 46, the concentration of pre-dilution sample S is diluted four times. Note that a numerical value of a different type (for example, % value) may be input to dilution factor field 46. For example, when "20%" is input to dilution factor field 46, the concentration of pre-dilution sample S is diluted five times.

Dilution determination mode button 43 is a button for setting a dilution determination mode. The dilution determination mode is a mode in which control device 70 automatically determines whether to dilute the sample. When the user operates dilution determination mode button 43 and then operates analysis start button 47, electrophoresis apparatus 300 determines whether to dilute. The dilution determination mode is preferably set, for example, when the user does not know whether to dilute the sample.

Dilution factor determination mode button 44 is a button for setting a dilution factor determination mode. The dilution factor determination mode is a mode in which control device 70 automatically determines the sample dilution factor. When the user operates dilution determination mode button 43 and then operates analysis start button 47, electrophoresis apparatus 300 determines the sample dilution factor. The dilution factor determination mode is preferably set, for example, when the user does not know the sample dilution factor.

[Functional Block Diagram of Control Device]

Figure 10:
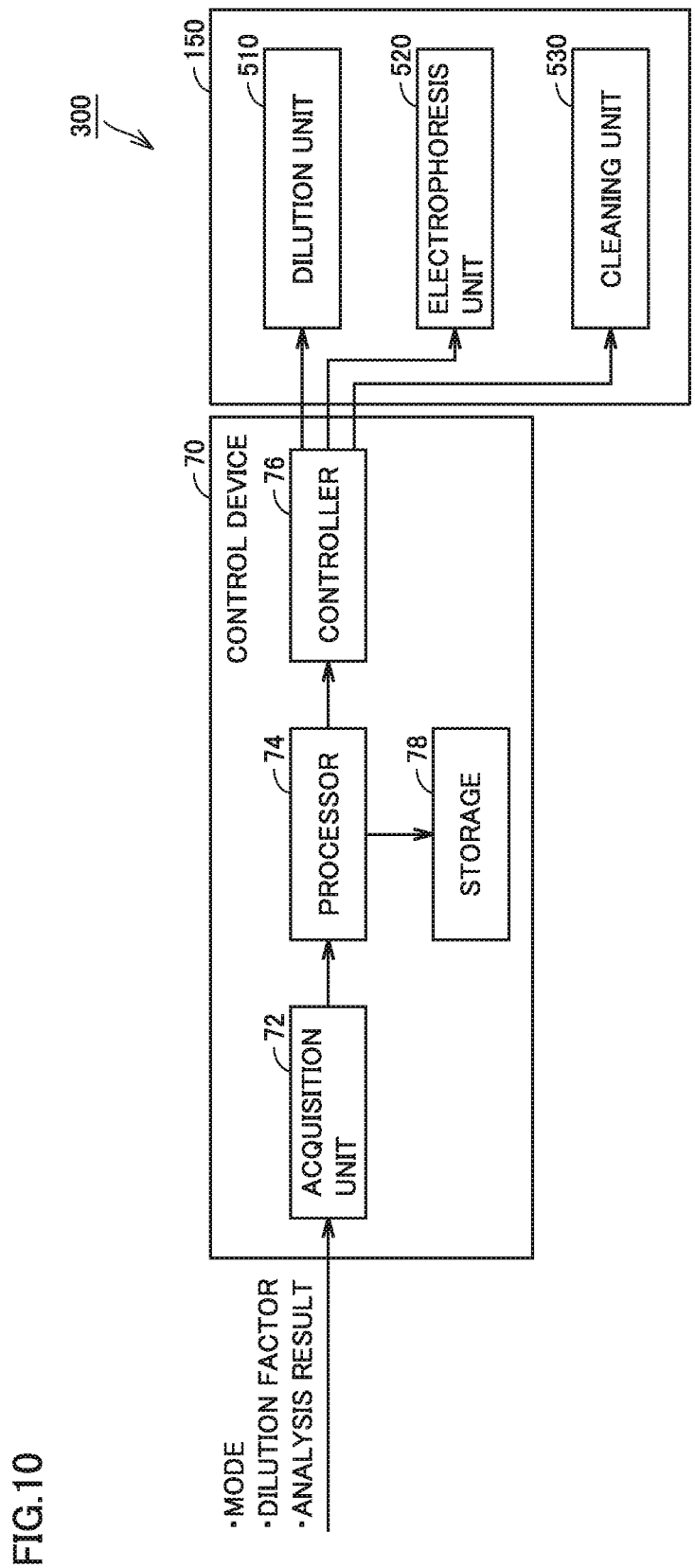
FIG. 10 is a functional block diagram of a control device 70.

FIG. 10 is a functional block diagram of control device 70. Control device 70 includes an acquisition unit 72, a processor 74, a controller 76, and a storage 78.

Acquisition unit 72 acquires various types of information. Acquisition unit 72 acquires mode information, a dilution factor, an analysis result, or the like. The mode information is information based on which of non-dilution mode button 41, normal dilution mode button 42, dilution determination mode button 43, and dilution factor determination mode button 44 illustrated in FIG. 9 is operated. The dilution factor is data that can specify the dilution factor input to dilution factor field 46 illustrated in FIG. 9.

Acquisition unit 72 outputs the information thus acquired to processor 74. Processor 74 performs processing in accordance with the acquired information. For example, when the information acquired by processor 74 is the mode information, processor 74 stores a mode flag that can specify the mode specified from the mode information into storage 78 (for example, RAM 164). Storing the mode flag sets the mode indicated by the mode flag.

Further, processor 74 outputs information generated from the processing result to controller 76. Controller 76 mainly controls dilution unit 510, electrophoresis unit 520, and cleaning unit 530 based on the information thus received. Note that dilution unit 510, electrophoresis unit 520, and cleaning unit 530 are included in analysis device 150. For example, controller 76 transmits a control signal to a target unit to control the target unit.

First, processing performed by control device 70 when the non-dilution mode is set (when non-dilution mode button 41 is operated) will be described. When the non-dilution mode is set, controller 76 causes electrophoresis unit 520 to analyze the sample without diluting the sample.

Note that, even when the sample is not diluted, dispensing probe 8 supplies the sample (pre-dilution sample S) stored in first container 121 to the analysis start position (for example, reservoir 53-1 described above) of electrophoresis unit 520. Then, electrophoresis unit 520 analyzes diluted sample S1 by electrophoresing diluted sample S1. That is, in the present embodiment, regardless of whether the sample is diluted or not diluted, dispensing probe 8 supplies the sample to the analysis start position. Therefore, in both the case where the sample is not diluted and the case where the sample is diluted, the sample is discharged to the analysis start position by dispensing probe 8. This can make electrophoresis apparatus 300 of the present embodiment small in the number of components as compared with a configuration where different dispensing probes are used for the sample that is not diluted and the sample that is diluted.

Further, when the non-dilution mode is set (when the sample is not diluted), electrophoresis unit 520 can analyze the sample regardless of whether the sample is stored in first container 121 or second container 122. That is, when the sample is not diluted, electrophoresis unit 520 can analyze the sample stored in second container 122 by electrophoresing the sample. This allows, regardless of whether the sample is diluted or not, an effective use of 96 wells 12W (first container 121 and second container 122).

Next, processing performed by control device 70 when the normal dilution mode is set (when normal dilution mode button 42 is operated) will be described. When normal dilution mode button 42 is operated and then analysis start button 47 is operated, control device 70 performs the following processing.

Acquisition unit 72 acquires the dilution factor input on the display screen illustrate in FIG. 9. Acquisition unit 72 outputs the dilution factor to processor 74. Processor 74 calculates the amount of dilution water based on the dilution factor. Hereinafter, an example of how to calculate the amount of dilution water will be described. Note that electrophoresis apparatus 300 of the present embodiment does not include a volume sensor that detects the amount of the pre-dilution sample stored in first container 121. Such a configuration allows a reduction in the number of components.

Further, as described above, dispensing probe 8 moves pre-dilution sample S of "a (μL)" from first container 121 to second container 122. Further, the dilution factor input to dilution factor field 46 is denoted as "b", and the amount of dilution water to be calculated is denoted as "B". In this case, the following equation (1) holds true.

$$B = a \times (b-1) \tag{1}$$

For example, when a=2 μL, and the dilution factor b input to dilution factor field 46 is "10 times", amount of dilution water B is 18 μL.

Processor 74 calculates amount of dilution water B using the above-described equation (1). Further, processor 74 may calculate amount of dilution water B using, instead of the above-described equation (1), a table indicating the above-described equation (1).

Note that the configuration where the amount of the pre-dilution sample moved from first container 121 to second container 122 is fixed value a has been described above. Here, when dilution factor b input to dilution factor field 46 is excessively large, a large amount of dilution water is used. In this case, pre-dilution sample S corresponding to fixed value a and a large amount of dilution water are injected into second container 122. The maximum amount that second container 122 can store, however, is a fixed amount. Therefore, when the total amount of pre-dilution sample S corresponding to fixed value a and the large amount of dilution water exceeds the fixed amount, second container 122 cannot store all of pre-dilution sample S corresponding to fixed value a and the large amount of dilution water. Therefore, for example, when dilution factor b input to dilution factor field 46 is excessively large (for example, when dilution factor b is greater than or equal to a threshold), electrophoresis apparatus 300 may reduce the amount of the pre-dilution sample to be moved from first container 121 to second container 122.

Processor 74 outputs amount of dilution water B to controller 76. Under the control of controller 76, dilution unit 510 dilutes the pre-dilution sample with amount of dilution water B. Then, under the control of controller 76, electrophoresis unit 520 analyzes the diluted sample.

As described above, control device 70 receives the dilution factor input to dilution factor field 46. Then, dilution unit 510 dilutes the pre-dilution sample based on the dilution factor. Therefore, the pre-dilution sample can be diluted based on the dilution factor desired by the user.

Next, processing performed by control device 70 when the dilution determination mode is set (when dilution determination mode button 43 is operated) will be described. When dilution determination mode button 43 is operated and then analysis start button 47 is operated, control device 70 performs the following processing.

In the dilution determination mode, control device 70 determines the necessity of dilution of a second sample based on an analysis result of a first sample. Note that the first sample and the second sample are extracted from the same sample stored in first container 121. That is, it is assumed that the concentration of the first sample and the concentration of the second sample are the same. The second sample corresponds to a "sample to be analyzed next" of the present disclosure. Note that the first sample and the second sample may be stored in different first containers 121.

First, under the control of controller 76, electrophoresis unit 520 consumes part of the pre-dilution sample stored in first container 121 as the first sample, and analyzes the first sample. Then, processor 74 acquires the analysis result (analysis data) of the first sample analyzed by electrophoresis unit 520 via acquisition unit 72. Processor 74 determines the necessity of dilution of the second sample based on the analysis data of the first sample. The second sample is a sample stored in first container 121 in which the first sample is stored. Then, when processor 74 determines that dilution is necessary, dilution unit 510 dilutes the sample (second sample) to be analyzed next.

Figure 11:
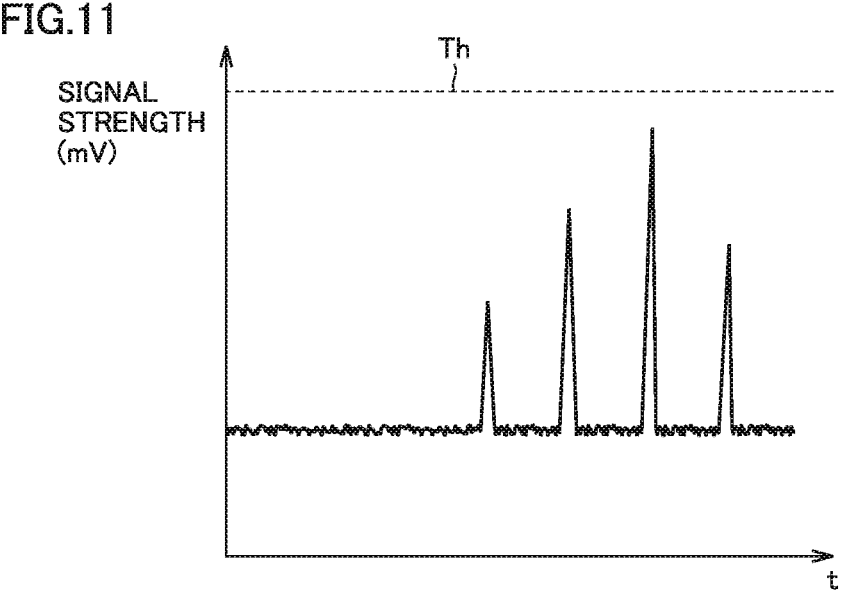
FIG. 11 is a diagram illustrating an example of an analysis result when the concentration of the sample falls within a normal range.
Figure 12:
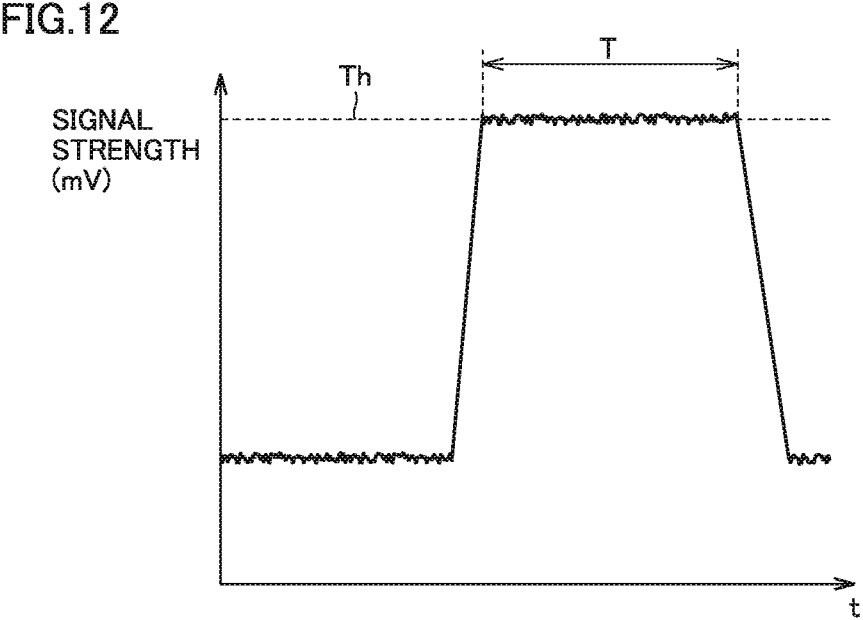
FIG. 12 is a diagram illustrating an example of an analysis result when the concentration of the sample falls outside the normal range.

FIG. 11 is a diagram illustrating an example of the analysis result when the concentration of the first sample falls within the normal range. In FIG. 11 and FIG. 12 to be described later, the horizontal axis represents the electrophoresis time, and the vertical axis represents the strength of the analysis signal output from photomultiplier 36. FIG. 12 shows an upper limit value Th of the signal strength. Upper limit value Th is the maximum value of the signal strength that can be detected by processor 74. In the example illustrated in FIG. 11, four peaks are shown.

FIG. 12 is a diagram illustrating an example of the analysis result when the concentration of the first sample falls outside the normal range. When the concentration of the sample falls outside the normal range, the signal strength detected by processor 74 may exceed upper limit value Th as shown in FIG. 12. In this case, control device 70 cannot accurately detect the signal strength. Hereinafter, a period during which the signal strength is greater than upper limit value Th (that is, a period during which the signal strength cannot be accurately detected) is referred to as a "non-detection period T". The higher the concentration of the first sample, the longer non-detection period T tends to be.

For example, processor 74 determines the necessity of dilution of the second sample based on non-detection period T. More specifically, processor 74 determines whether non-detection period T is less than a predetermined threshold. Data of this threshold is stored in storage 78.

When non-detection period T is less than the threshold, the concentration of the first sample is not high, so that processor 74 determines that the concentration of the second sample is also not high, and determines not to dilute the second sample. As described above, the first sample and the second sample are the same. Therefore, when a determination is made that the second sample is not diluted, electrophoresis apparatus 300 derives the analysis result of the first sample as the analysis result of the second sample by using the analysis data of the first sample. That is, electrophoresis apparatus 300 need not analyze the second sample, and can derive the analysis result of the first sample as the analysis result of the second sample.

On the other hand, when non-detection period T is greater than or equal to the threshold, the concentration of the first sample is high, so that processor 74 determines that the concentration of the second sample is also high, and determines to dilute the second sample.

Furthermore, processor 74 determines the dilution factor based on non-detection period T. For example, the dilution factor is calculated such that the longer non-detection period T, the larger the dilution factor. More specifically, a configuration where non-detection period T and the dilution factor are proportional to each other may be employed. Further, when the dilution factor is input by the user, processor 74 may use the dilution factor thus input. For example, processor 74 calculates the amount of dilution water based on the above-described equation (1). Then, when the sample is diluted, controller 76 causes dilution unit 510 to dilute the sample based on the amount of dilution water, and causes electrophoresis unit 520 to analyze the sample thus diluted.

As described above, in the dilution determination mode, control device 70 can determine the necessity of dilution of the second sample based on the analysis data of the first sample. Therefore, for example, even when the user does not know the necessity of dilution of the sample, electrophoresis apparatus 300 can appropriately determine the necessity of dilution of the sample.

Next, processing performed by control device 70 when the dilution factor determination mode is set (when dilution factor determination mode button 44 is operated) will be described. When the user operates dilution factor determination mode button 44 and then operates analysis start button 47, electrophoresis apparatus 300 determines the dilution factor of the sample.

Next, how to determine the dilution factor will be described. Under this method, control device 70 determines a dilution factor of a fourth sample based on analysis results of N (N is an integer greater than or equal to two) third samples. The user may change N. Note that the N third samples and the fourth sample are extracted from the same sample stored in first container 121. That is, it is assumed that the concentrations of the N third samples and the concentration of the fourth sample are the same. Note that the N third samples and the fourth sample may be stored in different first containers 121.

Specifically, dilution unit 510 dilutes the N samples at different dilution factors. Here, it is assumed that N=3. That is, dilution unit 510 dilutes three third samples S1, S2, S3 at dilution factors C1, C2, C3, respectively. Next, electrophoresis unit 520 analyzes the three diluted third samples to derive analysis results of the three diluted third samples. Then, electrophoresis unit 520 selects a suitable analysis result from among the three analysis results. The selection criteria are based on, for example, whether the signal strength (see FIG. 11 and the like) falls within the normal range, whether non-detection period T is short (whether non-detection period T is zero), and the like. Control device 70 selects a suitable analysis result and specifies a dilution factor corresponding to the analysis result (hereinafter, the dilution factor is also referred to as an "optimum dilution factor"). Then, dilution unit 510 dilutes the fourth sample at the optimum dilution factor.

As described above, in the dilution factor determination mode, control device 70 determines the dilution factor based on the analysis results of the plurality of (for example, three) samples diluted at the different dilution factors (C1 to C3 described above). Therefore, for example, even when the user does not know the dilution factor, electrophoresis apparatus 300 can appropriately determine the dilution factor of the sample.

Note that, in the dilution factor determination mode, for example, three third samples and one fourth sample are consumed from the same first container 121 as described above. Therefore, first container 121 needs to store a sample whose mount corresponds to at least four times of analysis. In other words, the minimum amount for first container 121 is equal to an amount corresponding to four times of analysis. For example, when the dilution factor determination mode is set, electrophoresis apparatus 300 may make a notification such as "whether a sample whose amount corresponds to four times of analysis is stored in first container 121" to the user.

[Flowchart of Electrophoresis Apparatus]

Figure 13:
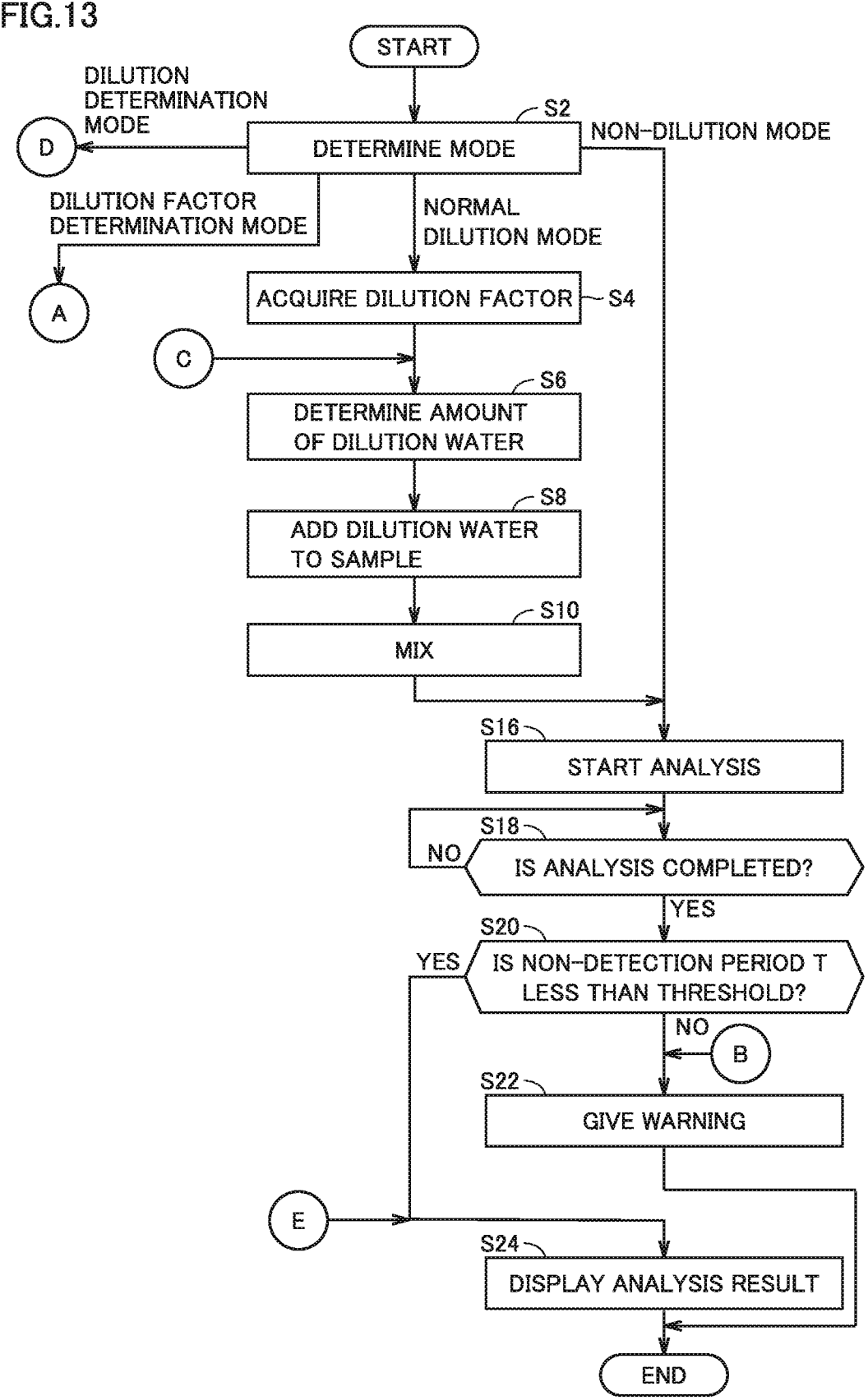
FIG. 13 is a flowchart of processing performed by the electrophoresis apparatus.
Figure 14:
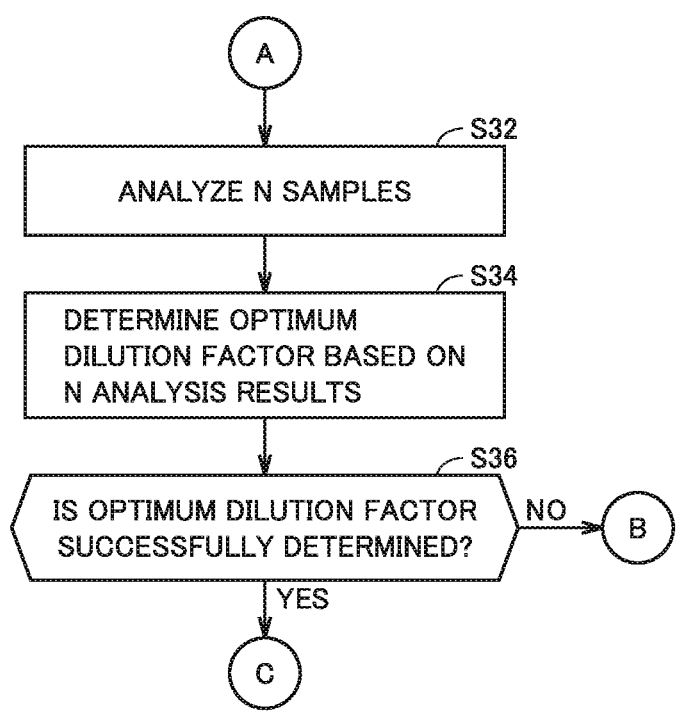
FIG. 14 is a flowchart of the processing performed by the electrophoresis apparatus.
Figure 15:
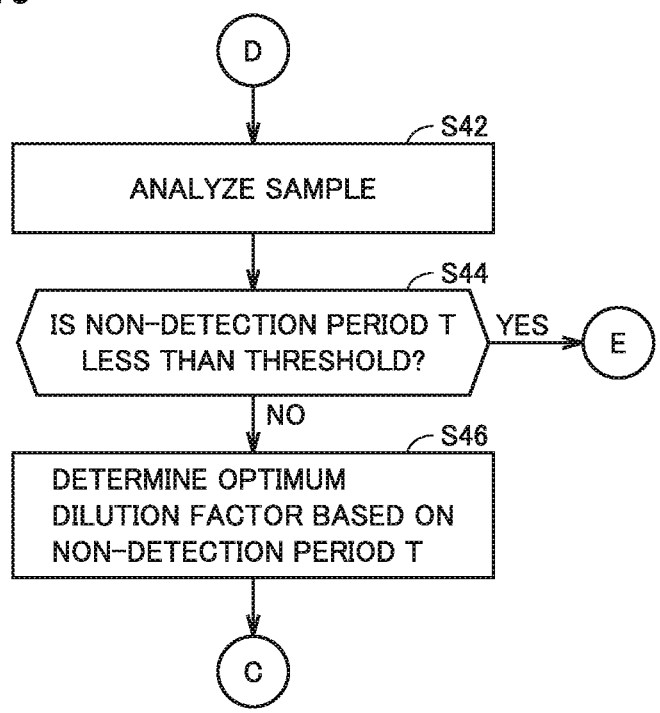
FIG. 15 is a flowchart of the processing performed by the electrophoresis apparatus.

FIGS. 13 to 15 are flowcharts illustrating processing performed by electrophoresis apparatus 300. First, with reference to FIG. 13, processing performed by electrophoresis apparatus 300 will be described. When analysis start button 47 illustrated in FIG. 9 is operated, processing illustrated in FIG. 13 starts.

First, in step S2, control device 70 determines a set mode. As described above, control device 70 determines the mode based on the mode flag stored in storage 78.

First, a case where the non-dilution mode is set will be described. In this case, the processing proceeds to step S16. In step S16, under the control of control device 70, electrophoresis unit 520 starts to analyze the sample.

Next, in step S18, control device 70 determines whether the analysis has been completed. In step S18, a determination is made as to whether a predetermined termination condition is satisfied. The termination condition is, for example, a condition that the analysis of all the samples set by the user has been completed. Electrophoresis unit 520 continues the analysis of the sample until it is determined to be YES in step S18. Then, when a determination is made that the analysis of all the samples has been completed, control device 70 determines in step S20 whether non-detection period T (see FIG. 12) is less than the threshold in the analysis results of all the samples.

When there is an analysis result in which non-detection period T is greater than or equal to the threshold among all the analysis results (NO in step S20), control device 70 performs a warning process in step S22. Here, the warning process is a process of notifying the user that "the concentration of the sample is excessively high". The warning process is, for example, a process of displaying a character image indicating that "the concentration of the sample is excessively high" on display 80. Such a warning process performed by control device 70 makes it possible to cause the user to recognize that the concentration parameter (concentration) of the sample exceeds upper limit value Th. After the end of the warning process, the processing is brought to an end. Further, when it is determined to be YES in step S20, electrophoresis apparatus 300 outputs the analysis result (displays the analysis result on display 80) in step S24. Then, the processing is brought to an end.

When the normal dilution mode is set in step S2, the processing proceeds to step S4. In step S4, control device 70 acquires the dilution factor input to dilution factor field 46.

Next, in step S6, control device 70 determines the amount of dilution water based on the above-described equation (1). Next, the processing proceeds to step S8. In step S8, under the control of control device 70, dilution unit 510 adds, to the sample, the dilution water whose amount is determined in step S6 (see FIG. 8 at (A) to (C)). Next, in step S10, under the control of control device 70, dilution unit 510 mixes the dilution water and the sample together (see FIG. 8 at (D)). Next, the processing proceeds to step S16.

When the dilution factor determination mode is set in step S2, the processing proceeds to step S32 shown in FIG. 14. In step S32, under the control of control device 70, electrophoresis unit 520 analyzes N (for example, three) samples (the above-described third samples). Next, in step S34, control device 70 performs the process of determining the dilution factor (optimum dilution factor) based on the N analysis results. Next, in step S36, control device 70 determines whether the optimum dilution factor has been successfully determined. For example, when non-detection period T is greater than or equal to the threshold in all the N analysis results, it means that the optimal analysis result is not derived. In this case, it is determined to be NO in step S36, and the processing proceeds to step S22. Then, in step S22, control device 70 performs the warning process. The warning process is a process of notifying the user that the optimum dilution factor cannot be determined. Then, the processing is brought to an end. On the other hand, when control device 70 can determine the dilution factor (YES in step S36), the processing proceeds to step S6. In step S6, control device 70 determines the amount of dilution water by substituting the optimum dilution factor into the above-described equation (1).

Next, when the dilution determination mode is set in step S2, the processing proceeds to step S42 shown in FIG. 15. In step S42, under the control of control device 70, electrophoresis unit 520 analyzes the sample (the above-described first sample). Next, in step S44, control device 70 determines whether non-detection period T is less than the threshold.

When non-detection period T is less than the threshold (YES in step S44), the processing proceeds to step S24.

Then, in step S24, control device 70 displays the analysis result of the first sample on display 80 as the analysis result of the second sample.

On the other hand, when non-detection period T is greater than or equal to the threshold (NO in step S44), control device 70 determines the optimum dilution factor based on non-detection period T in step S46. Then, the processing proceeds to step S6. In step S6, control device 70 determines the amount of dilution water by substituting the optimum dilution factor into the above-described equation (1).

Note that, in the above-described embodiment, the electrophoresis apparatus using the microchip as a device has been given as an example. The device, however, may be another object. The device may be, for example, a capillary.

Aspects

It is to be understood by those skilled in the art that the plurality of embodiments described above are specific examples of the following aspects.

(Clause 1) An electrophoresis apparatus according to one aspect includes a dilution unit that dilutes a sample with dilution water, an electrophoresis unit that analyzes the sample diluted by the dilution unit by electrophoresing the sample, and a control device that controls the dilution unit and the electrophoresis unit.

With such a configuration, after the dilution unit dilutes the sample, the electrophoresis unit analyzes the sample thus diluted by electrophoresing the sample. Therefore, even when the concentration of the sample is excessively high, it is possible to suppress deterioration in performance of the analysis of the sample.

(Clause 2) In electrophoresis apparatus according to the first aspect, the dilution unit includes a storage container that stores the dilution water, a first container that stores the sample, a probe, and a second container. The probe sucks the sample from the first container and discharges the sample into the second container, and sucks the dilution water from the storage container and discharges the dilution water into the second container.

Such a configuration allows the sample to be suitably diluted by the probe and the like.

(Clause 3) In the electrophoresis apparatus according to the second aspect, the probe sucks part of the sample stored in the first container and discharges the part of the sample into the second container.

Such a configuration allows pre-dilution sample to remain in the first container.

(Clause 4) In the electrophoresis apparatus according to the second or third aspect, when the sample is not diluted, the electrophoresis unit analyzes the sample stored in the second container by electrophoresing the sample.

Such a configuration allows, even when the sample is not diluted, an effective use of the second container.

(Clause 5) In the electrophoresis apparatus according to any one of the second to fourth aspects, the probe mixes the sample and the dilution water stored in the second container by repeatedly sucking and discharging the sample and the dilution water.

Such a configuration allows, even when the sample to which the dilution water is added is not completely diluted, the electrophoresis apparatus to suitably dilute the sample.

(Clause 6) The electrophoresis apparatus according to any one of the second to fifth aspects further includes a plate provided with the first container and the second container.

Such a configuration allows a reduction in the number of components as compared with a configuration where the first container and the second container are provided in separate components.

(Clause 7) The electrophoresis apparatus according to the sixth aspect further includes a display device that displays an image corresponding to the first container and an image corresponding to the second container in different manners.

Such a configuration allows the user to distinguish between the first container and the second container and identify the position of the first container. It is therefore possible to reduce the possibility that the user erroneously stores the sample into the second container.

(Clause 8) In the electrophoresis apparatus according to any one of the second to seventh aspects, when a mode in which the sample is not diluted is set, the probe sucks the sample stored in the first container and discharges the sample to a predetermined position on the electrophoresis unit, and when a mode in which the sample is diluted is set, the probe sucks the diluted sample stored in the second container and discharges the diluted sample to the predetermined position.

Such a configuration causes, in both a case where the sample is not diluted and a case where the sample is diluted, the dispensing probe to suck the sample and discharges the sample to the predetermined position on the electrophoresis unit. This can make the electrophoresis apparatus having this configuration small in the number of components as compared with a configuration where separate dispensing probes are used for the sample that is not diluted and the sample that is diluted.

(Clause 9) The electrophoresis apparatus according to any one of the second to eighth aspects further includes a cleaning unit that cleans the probe with the dilution water.

Such a configuration allows the dilution water and the cleaning water to be stored in the same storage container.

(Clause 10) In the electrophoresis apparatus according to any one of the first to ninth aspects, the control device receives an input dilution factor applied to the dilution unit, and the dilution unit dilutes the sample based on the input dilution factor.

Such a configuration allows the sample to be diluted based on the dilution factor desired by the user.

(Clause 11) In the electrophoresis apparatus according to the tenth aspect, the dilution unit dilutes the sample with the dilution water whose amount is based on the input dilution factor.

Such a configuration allows, even when the electrophoresis apparatus does not specify the concentration of the sample, the sample to be suitably diluted.

(Clause 12) In the electrophoresis apparatus according to any one of the first to eleventh aspects, the control device acquires analysis data of the sample analyzed by the electrophoresis unit, and determines whether dilution is necessary based on the analysis data, and the dilution unit dilutes a sample to be analyzed next when the control device determines that dilution is necessary.

Such a configuration allows, even when the user does not know the necessity of dilution of the sample, the electrophoresis apparatus to appropriately determine the necessity of dilution of the sample.

(Clause 13) In the electrophoresis apparatus according to any one of the first to twelfth aspects, the control device performs a warning process when a concentration parameter of the sample analyzed by the electrophoresis apparatus falls outside a predetermined range.

Such a configuration allows the user to recognize that the concentration parameter of the sample analyzed by the electrophoresis apparatus falls outside the predetermined range.

(Clause 14) In the electrophoresis apparatus according to any one of the first to thirteenth aspects, the control device determines a dilution factor of the dilution unit based on analysis results of a plurality of samples diluted at dilution factors different from each other.

Such a configuration allows, even when the user does not know the dilution factor, the electrophoresis apparatus to determine the dilution factor.

(Clause 15) A method using an electrophoresis apparatus according to one aspect includes diluting a sample with dilution water, and analyzing the sample diluted by electrophoresing the sample.

With such a configuration, after a dilution unit dilutes the sample, an electrophoresis unit analyzes the sample thus diluted by electrophoresing the sample. Therefore, even when the concentration of the sample is excessively high, it is possible to suppress deterioration in performance of the analysis of the sample.

The embodiments disclosed herein are also intended to be appropriately combined and practiced within a range where there is no technical contradiction. It should be understood that the embodiments disclosed herein are illustrative in all respects and not restrictive. The scope of the present embodiments is defined by the claims rather than the above description of the embodiments, and the embodiments are intended to include the claims, equivalents of the claims, and all modifications within the scope.

What is claimed is:

1. An electrophoresis apparatus comprising:
   a dilution unit configured to dilute a sample with dilution water;
   an electrophoresis unit configured to analyze the sample diluted by the dilution unit by electrophoresis the sample; and
   a control device that configured to control the dilution unit and the electrophoresis unit;
   wherein
   the dilution unit includes:
   a storage container configured to store the dilution water;
   a first container configured to store a pre-dilution sample;
   a dispensing probe; and
   a second container, wherein the dispensing probe is configured to suck the pre-dilution sample from the first container and discharge the pre-dilution sample into the second container, and further configured to suck the dilution water from the storage container and discharges the dilution water into the second container;
   wherein the electrophoresis apparatus comprises a plate, said plate comprising the first and second containers of the dilution unit; and wherein the electrophoresis apparatus further comprises a display device configured to display both an image corresponding to the first container and an image corresponding to the second container in different manners.

2. The electrophoresis apparatus according to claim 1, wherein the probe is configured to suck part of the pre-dilution sample stored in the first container and discharge the part of the pre-dilution sample into the second container.

3. The electrophoresis apparatus according to claim 1, wherein
when the sample is not diluted, the electrophoresis unit is configured to analyze the pre-dilution sample stored in the second container by electrophoresis the pre-dilution sample.

4. The electrophoresis apparatus according to claim 1, wherein
The dispensing probe is configured to mix the sample and the dilution water stored in the second container by repeatedly sucking and discharging the pre-dilution sample and the dilution water.

5. The electrophoresis apparatus according to claim 1 wherein
when a mode in which the sample is not diluted is set, the dispensing probe is configured to suck the pre-dilution sample stored in the first container and discharges the sample to a predetermined position on the electrophoresis unit, and when a mode in which the sample is diluted is set, the probe is configured to suck a diluted sample stored in the second container and discharges the diluted sample to the predetermined position.

6. The electrophoresis apparatus according to claim 1, further comprising a cleaning unit configured to cleans the probe with the dilution water.

7. The electrophoresis apparatus according to claim 1, wherein the control device is configured to receive an input dilution factor applied to the dilution unit, and the dilution unit is configured to dilute the sample based on the input dilution factor.

8. The electrophoresis apparatus according to claim 7, wherein the dilution unit is configured to dilute the pre-dilution sample with the dilution water whose amount is based on the input dilution factor.

9. The electrophoresis apparatus according to claim 1, wherein the control device is configured to acquire analysis data of the pre-dilution sample analyzed by the electrophoresis unit, and determines whether dilution is necessary based on the analysis data, and the dilution unit dilutes the pre-dilution sample to be analyzed next when the control device determines that dilution is necessary.

10. The electrophoresis apparatus according to claim 1, wherein the control device is configured to perform a warning process when a concentration parameter of the pre-dilution sample analyzed by the electrophoresis apparatus falls outside a predetermined range.

11. The electrophoresis apparatus according to claim 1, wherein the control device is configured to determine a dilution factor of the dilution unit based on analysis results of a plurality of samples diluted at dilution factors different from each other.

12. A method using an electrophoresis apparatus, comprising:
   diluting a pre-dilution sample with dilution water by a dilution unit; and
   analyzing pre-dilution the sample diluted by electrophoresis the sample;
   wherein the dilution unit includes:
   a storage container that configured to store the dilution water;
   a first container that stores a pre-dilution sample;
   a dispensing probe; and
   a second container, wherein the dispensing probe is configured to suck the pre-dilution sample from the first container and discharge the pre-dilution sample into the second container, and further configured to suck the dilution water from the storage container and discharges the dilution water into the second container;

wherein the electrophoresis apparatus comprises a plate, said plate comprising the first and second containers of the dilution unit; and wherein the method further comprises displaying an image corresponding to the first container and an image corresponding to the second container in different manners on a display device.

13. An electrophoresis apparatus comprising:
a dilution unit configured to dilute a sample with dilution water;
an electrophoresis unit configured to analyze the sample diluted by the dilution unit by electrophoresis the sample; and
a control device configured to control both the dilution unit and the electrophoresis unit, wherein the dilution unit includes:
a storage container configured to store the dilution water;
a first container configured to store a pre-dilution sample;
a dispensing probe; and
a second container, wherein the dispensing probe is configured to suck the pre-dilution sample from the first container and discharge the pre-dilution sample into the second container, and further configured to suck the dilution water from the storage container and discharges the dilution water into the second container;
wherein the electrophoresis apparatus further comprises a cleaning unit configured to clean the dispensing probe with the same dilution water stored in the storage container.

* * * * *